Figure 1:
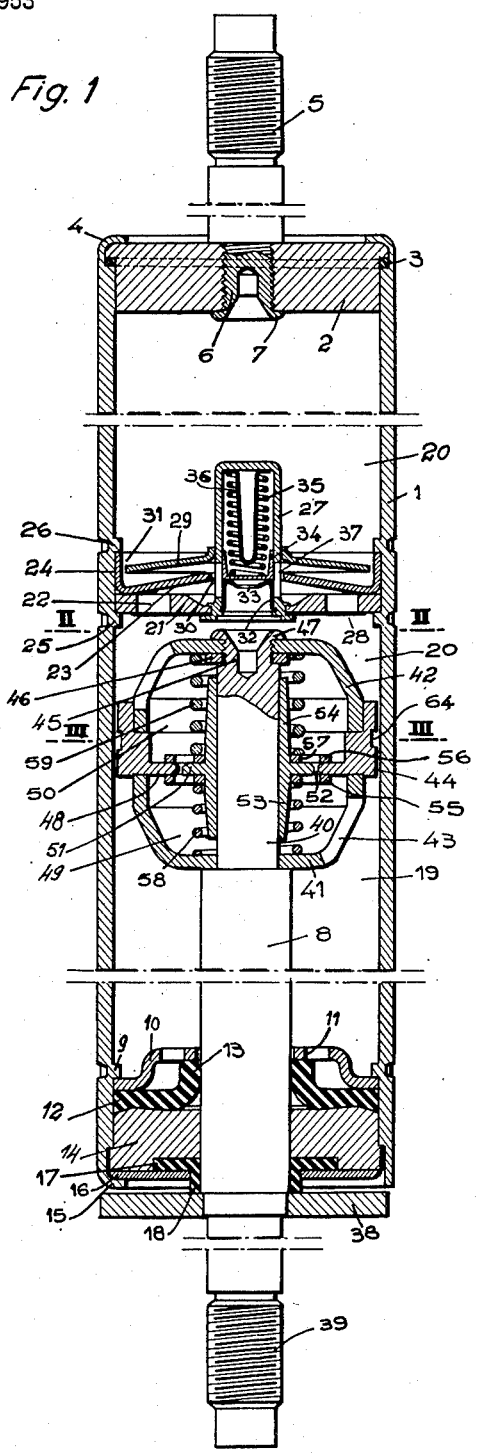

May 21, 1957 L. BÉNARD 2,792,914
HYDRAULIC SHOCK ABSORBER
Filed Oct. 8, 1953 2 Sheets-Sheet 1

May 21, 1957  L. BÉNARD  2,792,914
HYDRAULIC SHOCK ABSORBER
Filed Oct. 8, 1953  2 Sheets-Sheet 2

United States Patent Office 2,792,914
Patented May 21, 1957

2,792,914
HYDRAULIC SHOCK ABSORBER

Lucien Bénard, Gentilly, France

Application October 8, 1953, Serial No. 384,970

Claims priority, application France October 13, 1952

6 Claims. (Cl. 188—88)

The present invention relates to shock absorbers for suspension and particularly to hydraulic shock absorbers for suspension of the type comprising a cylinder and a piston adapted to slide in this cylinder, connected respectively to two members suspended one from the other, of which it is desired to damp the relative movements. The invention has for its object an improvement shock absorber of this type.

In shock absorber of the type referred to, the displacement of the piston in the cylinder can only take place owing to the passage of oil from a chamber of the cylinder to the other, and to this end the piston comprises at least one restricted passage which offers to the flow of oil a resistance the magnitude of which determines a braking action on the movement of the piston, and consequently the desired damping.

It is known that for the suspension of motor vehicles there is advantage in providing a decrease of the damping in the case of a brutal shock, in order to enable the piston to move more rapidly and that the suspension should preserve the desired suppleness. For this purpose, it has already been proposed to provide that some of the oil passages through the piston should normally be closed by discharge valves and should not open in the case of slow movements, but should permit a rapid flow of the oil when the pressure in one of the chambers of the cylinder exceeds a predetermined value, sufficient to lift the valves, owing to a brutal shock on the suspension.

A drawback of the known arrangements is the difficulty of adjusting the discharge valves, so that their working takes place according to the desired laws when a discharge is necessary. Besides, the resistance of the oil passages varies according to the viscosity of the oil, which depends essentially on the temperature.

The present invention has for its object a hydraulic shock absorber for suspension the disposition of which is such as to be free from the drawbacks mentioned.

This disposition is characterized in that a passage for the damping liquid is provided through the piston with a constriction of given section, of small length, limited between a member solid with the piston and a second member, which is movable and adapted to slide axially inside the piston, and which is stabilised by springs so as to be normally level with the first mentioned member and to move in one or the other direction by compression of one of the springs according to the direction of the movement of the piston, when the pressure of the liquid forced to flow through this passage exceeds the resistance exerted by this spring in order to stabilise the said movable member.

The moveable member or cover, stabilized by the springs so as to face the member solid with the piston, between which the restricted passage for the liquid is provided, is an annular piece having the same thickness as a plane internal flange of the piston and is stabilized when at rest in the plane of this plane flange between two washers subjected to the thrusts of the opposing springs. These washers have an external diameter larger than the opening of the said flange so as to themselves rest against the corresponding faces of the latter at the same time as against the cover and they have apertures for the passage of oil opening into the restricted passage.

In this manner, the position of stabilization of the cover is absolutely independent of the force exerted by each of these two springs and it is perfectly determined with respect to the flange of the piston, which ensures a resistance to the flow exactly defined in normal working, that is to say as long as the pressure on one face of the piston does not exceed the thrust of the spring which opposes its action.

The springs are preferably calibrated differently, the spring opposing the discharge in the direction of the rebound being stronger than the spring which opposes the discharge in the direction of the compression. Besides, the displacement of the cover necessary for the discharge is different according to the direction of its displacement, owing to the fact that the edges of the members limiting the oil passage are chamfered on one face in a different manner than on the other face.

The dimension of the apertures of the washers on which rest the springs is selected so as to determine a given resistance to the flow, adding itself to that of the restricted passage.

The plane flange is preferably formed inside an annular cylindrical member connected to and fixed on the piston rod by two symmetrical hemispherical housings provided with apertures for the passage of oil and fitting in this annular member. The annular member has an external diameter a little smaller than the diameter of the bore of the cylinder, so as to provide a small systematic play of a tenth of a millimeter approximately and it has in its half-thickness an external groove of small depth.

In order to ensure a compensation of the variations of viscosity of the oil following variations of temperature, materials having different coefficients of expansion are selected for the cover and for the annular member carrying the flange limiting the passage of the oil opposite this cover, so that the relative variations of diameters cause a diminution of the section of the annular oil passage when the temperature rises.

Figure 2:
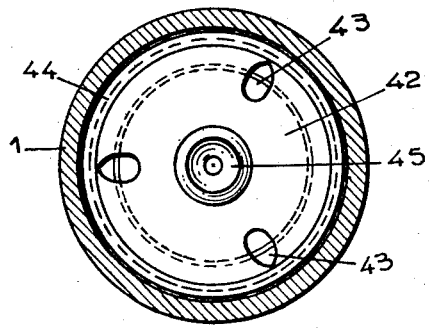
Figure 3:
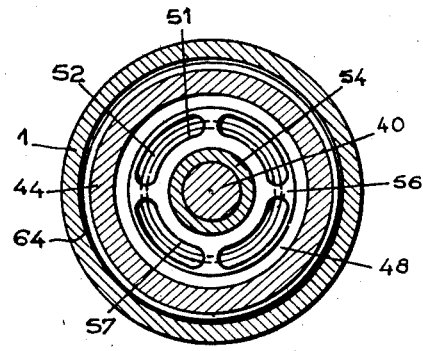
Figure 4:
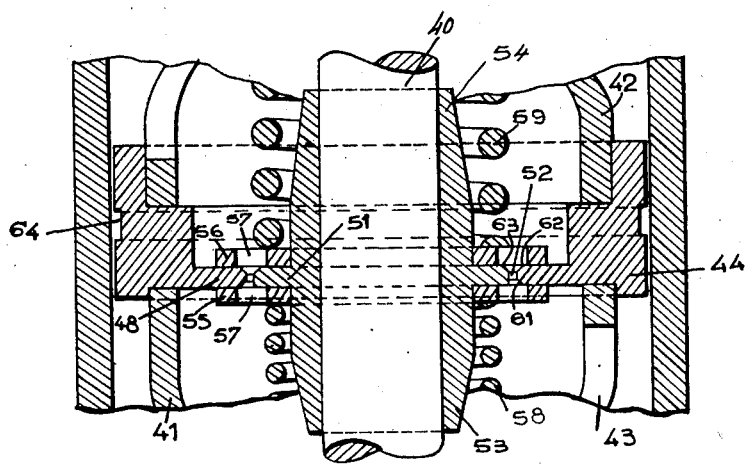

The invention will be described with reference to the accompanying drawings, which show an embodiment of shock absorber according to the invention and in which:

The Figure 1 is a longitudinal sectional along the axis of the cylinder;

The Figure 2 is a plan of the piston taken from the plane of the transverse section of the cylinder which corresponds to the line II—II of the Figure 1;

The Figure 3 is a transverse section along the line III—III of the Figure 1;

The Figure 4 represents, on a larger scale, a detail of the piston such as it is seen in Figure 1.

The body of the shock absorber, as shown in Figure 1, is constituted by a long tube 1 closed at both ends.

At the upper portion, the closure is ensured by a flanged stopper 2, the portion of smaller diameter of which is engaged in the tube, the flange of which fits in one end turned to a larger diameter and rests on a fluid-tight joint 3, and is locked by crimping at 4 the end of the tube. Solid with this stopper is a fastening threaded rod 5, a threaded end of which is screwed in a threaded bore of the stopper and is crimped at 7 against the internal face of the stopper so as to ensure the fluid-tightness.

The opposed end, or lower end of the cylinder, through which passes the piston rod 8, is closed as follows: at a certain distance from the end of the cylinder, internal projections 9 are formed by embossing, serving as support to a dished metallic washer 10 maintaining the closure and the fluid-tightness members of the cylinder and having holes 11 for the passage of oil. Against this washer rests a thick rubber washer 12 constituting a joint, the internal diameter of which is, in the free state, less than the diameter of the rod 8 and which is deformed towards the inside of the dished washer by the engagement of the rod, so as to form a flange 13 rubbing against the rod and pressed against the latter by the pressure of the oil, which can exert itself through the holes 11 of the dished washer. This joint is tightened at its periphery against the washer 10 by a flanged annular stopper 14, mounted in a similar manner to that of the upper end of the cylinder and maintained by a crimping 15 of the edge of the cylinder over a metallic washer 16 interposed between this edge and the stopper. This washer 16 maintains, in a circular housing in the external face of the stopper, a rubber washer 17 having a flange 18 which passes through the interposed washer 16 and rubs on the rod 8, playing the part of scraper.

The cylinder is divided into two compartments along its length, a lower one 19 constituting the cylinder properly so called, the other, above, 20, constituting a chamber for compensation of the variations of volume due to the more or less great penetration of the rod in the cylinder. These two compartments are separated by a partition formed of a washer 21 perforated with holes 22, resting against the periphery of a washer 23 with a conical face and a cylindrical flange 24, both these washers having an external diameter corresponding to the internal diameter of the tube and being maintained between two series of internal projections, 25 and 26, formed embossing on the wall of the cylinder. The washer 21 constituting a partition is thinner at its centre on the side of the compensation chamber and carries a socket 27 engaged in a central hole of the washer and crimped on the thinned edge of this hole, together with a flat piece of foil 28 applied against the face of the partition on the side of the cylinder and normally closing the holes 22 for the passage of oil through this partition. This socket 27 carries, at a small distance from the washer 23 with conical faces, another washer 29 with conical faces forming a parallel wall, the hole constituting a baffle for the oil with a passage 30 inside of the first washer, limited by a hole a little larger than the external diameter of the socket 27, and a passage 31 externally of the second one, owing to the fact that the external diameter of the latter is smaller than the internal diameter of the flange 24 of the other one. The inlet of the socket 27 is stopped by a hollow stopper 32 of thin sheet metal, encased in the socket, crimped on the latter and bored with a hole 33, concentrically, facing the bottom of a small piston 34 sliding in the socket. This piston is pushed against the stopper 32 by a spring 35 pressing against the bottom of the socket through a needle-shaped stamped piece 36, acting as guide and as limiting stop for this spring. At the height of the bottom of the stopper 32, the lateral wall of the socket 27 is perforated with holes 37 for the passage of the oil.

During the driving in stroke of the piston of the cylinder, this arrangement allows the passage of the excess of oil, which corresponds to the engagement of a greater length of the rod inside the cylinder, from the cylinder into the compensation chamber. The foil 28 closing the openings 22 of the partition 21, the pressure which is exerted in the hollow stopper 32 pushes back the piston 34, and the oil can pass by the baffle-shaped passages 30, 31. When the piston withdraws from the cylinder, the decrease of pressure ensures the return of the necessary oil from the compensation chamber into the cylinder by suction through the baffle-shaped passages and the openings 22 of the partition 21 uncovered by the yielding of the foil 28, the openings 37 being closed by the piston 34. The travel of the oil through the baffles in both cases has for its effect to cause a separation of the air in the forcing of the oil in the compensation chamber and to avoid its return towards the cylinder in the inverse flow.

The piston rod 8 carries externally of the cylinder, on a shoulder, a washer 38 intended for attaching a protector, not shown and this rod ends with a threaded portion 39 to enable it to be fixed to one of the members of the suspension. At its internal end it is terminated by a portion of smaller diameter 40, on which is fitted the piston. The latter is hollow, formed by two symmetrical housings 41 and 42 provided with apertures 43 for the passage of the oil and fitted in an intermediate annular member 44, the external diameter of which is less than the diameter of the bore of the cylinder by the amount of a systematic clearance of approximately one tenth of a millimeter. The portion 40 of the rod 8, of small diameter, has at its end a threaded portion 45 of lesser diameter, thereby forming a shoulder for a washer 46 against which rests the upper housing 42, which is screwed on the threaded end 45 and locked by a crimping 47 of the end.

The annular member 44, or piston ring, which receives the housings 41 and 42, is provided with an internal plane flange 48 dividing the hollow body of the piston into two chambers 49 and 50, which communicate respectively with the cylinder by the apertures 43 of the housings (see also Figure 2). A member or internal piston sliding on the rod 40, is formed by a flat cover 51, the external diameter of which is less than the diameter of the hole of the flat flange 48 but has the same thickness, so as to limit an oil passage 52 of restricted section. The cover is guided on the rod by two annular flanges 53, 54, the lengths of which determine the amplitude of the possible movement of the cover in each direction. On the two faces of the pair plane flange-cover, rest two washers 55 and 56 engaged on the annular flanges 53, 54 and provided with apertures 57 (see Figures 3 and 4) having a total calibrated section, which here is greater than the section of the restricted passage 52 level with the cover. These washers are applied against the opposite faces of the cover by two stabilising springs 58 and 59 resting respectively against the housings. The sliding member forming the cover 51 is of a material the coefficient of expansion of which is preferably greater than that of the piston ring 44, so that a rise of temperature produces a decrease in the thickness of the restricted passage compensating the decrease of viscosity of the oil. The sliding member may for example be made of the alloy of Zn 96% and Al 4% known under the name of "Zamak," while the piston ring is made of sintered iron, so that the coefficient of expansion of the first is twice as great as that of the second. Excellent results have also been obtained with other materials than "Zamak," particularly with the material known under the name of "nylon."

The stabilising springs 58, 59, are preferably of different forces, the upper spring 59 being more powerful than the lower spring 58. The restricted oil passage 52, which is an annular passage, has its length limited by the chamfers of the plane flange and of the cover. Two chamfers 61 and 62 (see Figure 4) of the opposite faces of the former and a chamfer 63 of the upper face of the latter are shown.

The working of the piston is as follows:

When the piston moves in the cylinder, oil must pass from one of the two spaces 19, 20 of the cylinder, separated by the piston, into the other. In order to do this, the oil may use two parallel annular passages, one comprised between the wall of the cylinder and the annular member 44, the other comprised between the flange 48 and the cover 51, both opposing to the flow of the oil resistance which together fix the value of the damping. The oil in the space which decreases owing to the movement of the piston (for example the space 20 during a compression stroke), penetrates in the front housing 42 with respect to this movement through the apertures 43, passes through the washers 56, 55 and the restricted passage 52 and issues by the apertures 43 of the other housing 41.

As long as the pressure exerted on the front face of the cover (high face) does not exceed the thrust of the spring 58 against the opposite face, the cover remains motionless and the resistance to the flow of the oil through the piston therefore depends not only on the section of the apertures 57 and of that of the restricted passage, but on the length of this passage between the bevels.

When the thrust of the spring 58 is exceeded, the front washer 56 remains motionless, since it is applied against the plane flange 48, while the rear washer follows the displacement of the cover 51. The "lift" of the latter determines an important increase in the section of the passage 52. The "lift" would be in the inverse direction during a "rebound" stroke (compression of the spring 59). In this manner a limitation of the value of the braking is obtained. In the case of a brutal shock, the piston may be displaced more rapidly owing to the fact that the oil passage has a greater section. The cover plays therefore a role analogous to that of a discharge valve.

It will be noticed that, the upper spring 59 being stronger than the lower spring 58, the pressure for which the discharge takes place is smaller in the compression stroke than in the rebound stroke. Besides, the cover being chamfered in 63 on one face only, the one which is facing towards the separating partition 21, which constitutes the "bottom" of the cylinder, the necessary stroke of the cover before the discharge may take place is greater in the direction of the rebound than in the direction of the compression.

By means of this arrangement, a very rational working of the shock absorber is obtained: it is in fact well known that it is advantageous to damp more strongly the movements of rebound than the movements of compression of the suspension. In the case of a shock on an obstacle, the movement of the wheel of the vehicle, which rises in causing the driving-in of the piston, is less strongly damped than the movement of subsidence of the wheel after the obstacle, and the discharge necessary to account for the too great speed of the movement in compression takes place more rapidly, since a lesser movement of the cover is required to ensure this discharge.

It will be noticed that the damping of the normal movements of the piston by braking of the oil passing round the piston and through the piston depend not only on the dimensions of the passages but also on the dimensions of the apertures 57 of the washers 55 and 56 on which repose the springs, which, according to their dimension, may offer a more or less large resistance to the flow of the liquid.

A suspension equipped with such a shock absorber presents therefore all the desired suppleness, its movements being nevertheless braked as they should be.

The piston ring 44 has its external surface cut by a shallow groove 64. It has been ascertained, as a matter of fact, without it being possible to give a convincing explanation, that this arrangement has for its effect to limit the formation of an emulsion in the oil of the air always present in more or less great quantity in the cylinder, owing to the demand made periodically on the reserve of oil in the compensation chamber, which contains some air in its upper portion. This improvement contributes as a share in the good working of the shock absorber, by ensuring the constancy of the viscosity, except in the case of variations in the temperature, in which case the variations of the viscosity specific to the oil are compensated by the differential expansion of the members which limit the restricted passage 52.

I claim:

1. In a hydraulic shock absorber for suspension having a cylinder containing damping liquid and a piston adapted to slide in said cylinder and provided with a damping passage therethrough, in combination, a rod for the piston, a hollow body secured on said rod and forming the piston, having large apertures through its end walls and formed with an annular plane inner flange intermediate said end walls externally limiting an annular opening around said rod, a slidable member on said rod inside said hollow piston body and formed with an annular plane outer flange of the same thickness as said inner flange and of an external diameter less than said opening, two washers lying against the opposite faces of said flanges, having an external diameter greater than said opening in said outer flange and an inner diameter less than the external diameter of said inner flange, and being provided with apertures for the oil passing through said opening, two springs mounted within said hollow piston body between the opposite end walls thereof and urging said washers to abut against the opposite face of said inner flange, whereby said movable member outer flange is normally held in a position aligned with said inner flange to limit therebetween a restricted passage giving a predetermined value of damping, and upon the pressure of the liquid on one side of the piston during a stroke thereof becoming greater than the thrust of the opposing spring, said outer flange is pushed with the washer intermediate said outer flange and said spring, producing a larger section of said opening and thus reducing the damping.

2. In a hydraulic shock absorber for suspension, the combination claimed in claim 1, in which said flanges are chamfered in a different manner on one face than on the other.

3. In a hydraulic shock absorber for suspension, the combination claimed in claim 1, in which the apertures in said washers have a section provided to determine a given resistance to the flow of damping liquid adding itself to that of said restricted passage.

4. In a hydraulic shock absorber for suspension having a cylinder containing damping liquid and a piston adapted to slide in said cylinder and provided with a damping passage therethrough, in combination, a rod for the piston, having a portion of restricted diameter starting from a first shoulder on said rod and terminated by a threaded end portion of less diameter starting from a second shoulder, a first hemispherical housing having lateral apertures and a top aperture and fitted on said portion of restricted diameter with its inner part facing the end of the rod and in abutment against said shoulder, an annular member engaged by the edge of said first hemispherical housing, forming the outer portion of said piston and formed with an annular plane inner flange limiting an annular opening around said rod, a second hemispherical housing symmetrically disposed to the first one engaged in said annular member by its edge, having lateral apertures and a top threaded aperture engaging said threaded end portion of the rod, which is crimped on the outer face of said second hemispherical housing, a slidable member on said rod portion of restricted diameter formed with an annular plane outer flange of the same thickness as said inner flange and of an external diameter less than said opening, two washers lying against the opposite faces of said flanges, having an external diameter greater than said opening in said outer flange and an inner diameter less than the external diameter of said inner flange, and being provided with apertures for the oil passing through said opening, two springs mounted within said hollow piston body between the opposite end walls thereof and urging said washers to abut against the opposite face of said inner flange, whereby said slidable member outer flange is normally held in a position facing said inner flange to limit therebetween a restricted passage giving a predetermined value of damping, and upon the pressure of the liquid on one side of the piston during a stroke thereof becoming greater than the thrust of the opposing spring, said outer flange is pushed with the washer intermediate said outer flange and said spring producing a larger section of said opening and thus reducing the damping.

5. In a hydraulic shock absorber for suspension, the combination claimed in claim 4, in which said annular member has a cylindrical outer surface of a diameter a little less than the diameter of the bore of the cylinder so as to provide a systematic small clearance of about one tenth of a millimeter, said surface being cut in its center by an external shallow groove.

6. In a hydraulic shock absorber for suspension, the combination claimed in claim 4, in which both hemispherical housings and said annular member are of materials of a coefficient of expansion different from that of the material forming the slidable member, in such a manner that the relative variations of diameter of said flanges determine a decrease of the section of said restricted passage therebetween when the temperature rises, whereby the increase of the resistance of said restricted passage to the flow of the liquid may compensate for the increase of the fluidity of said liquid.

References Cited in the file of this patent

UNITED STATES PATENTS

| | | |
|---|---|---|
| 1,143,753 | Fernanzo | June 22, 1915 |
| 1,178,996 | Duffing | Apr. 11, 1916 |

FOREIGN PATENTS

| | | |
|---|---|---|
| 838,403 | Germany | May 8, 1952 |